(12) United States Patent
DeVore et al.

(10) Patent No.: US 7,814,806 B2
(45) Date of Patent: Oct. 19, 2010

(54) APPARATUS AND METHOD FOR JOGGING TRANSMISSION NEUTRAL SWITCH

(75) Inventors: James H. DeVore, Metamora, IL (US);
Rudolf Kalthoff, Weingarten (DE);
Rupert Kramer, Friedrichshafen (DE);
Ronald Muetzel, Lake Zurich, IL (US);
Robert Sayman, Meckenbeuren (DE);
Mario Steinborn, Friedrichschafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 836 days.

(21) Appl. No.: 11/724,144

(22) Filed: Mar. 14, 2007

(65) Prior Publication Data
US 2008/0223167 A1  Sep. 18, 2008

(51) Int. Cl.
*F16H 59/00* (2006.01)
(52) U.S. Cl. .................. 74/335; 477/906; 74/473.37
(58) Field of Classification Search .................. 701/64
See application file for complete search history.

(56) References Cited

U.S. PATENT DOCUMENTS

| | | | | |
|---|---|---|---|---|
| 3,762,157 A * | 10/1973 | Kitai et al. | ................... | 368/222 |
| 4,445,393 A * | 5/1984 | Braun | ........................... | 74/346 |
| 4,702,127 A * | 10/1987 | Cote | ........................... | 477/75 |
| 6,655,227 B2 * | 12/2003 | Aoyama et al. | ................ | 74/335 |
| 2006/0162476 A1* | 7/2006 | Zimmermann et al. | ......... | 74/335 |

* cited by examiner

*Primary Examiner*—David D Le
*Assistant Examiner*—Justin Holmes
(74) *Attorney, Agent, or Firm*—Brinks Hofer Gilson & Lione

(57) ABSTRACT

A method and apparatus for cycling a neutral switch of an automated mechanical transmission includes software which, either independently or by operator command through a shift actuator having side-to-side motion capability and sensors, controls a select piston and cylinder assembly to provide shift rail motion along a transverse axis of the transmission which simulates operator commanded motion of a shift rail of a conventional (manual) transmission as the operator checks for neutral. Such activity may release a malfunctioning neutral switch thereby providing a proper neutral indication to associated transmission and engine components to, for example, permit starting of the engine.

20 Claims, 4 Drawing Sheets

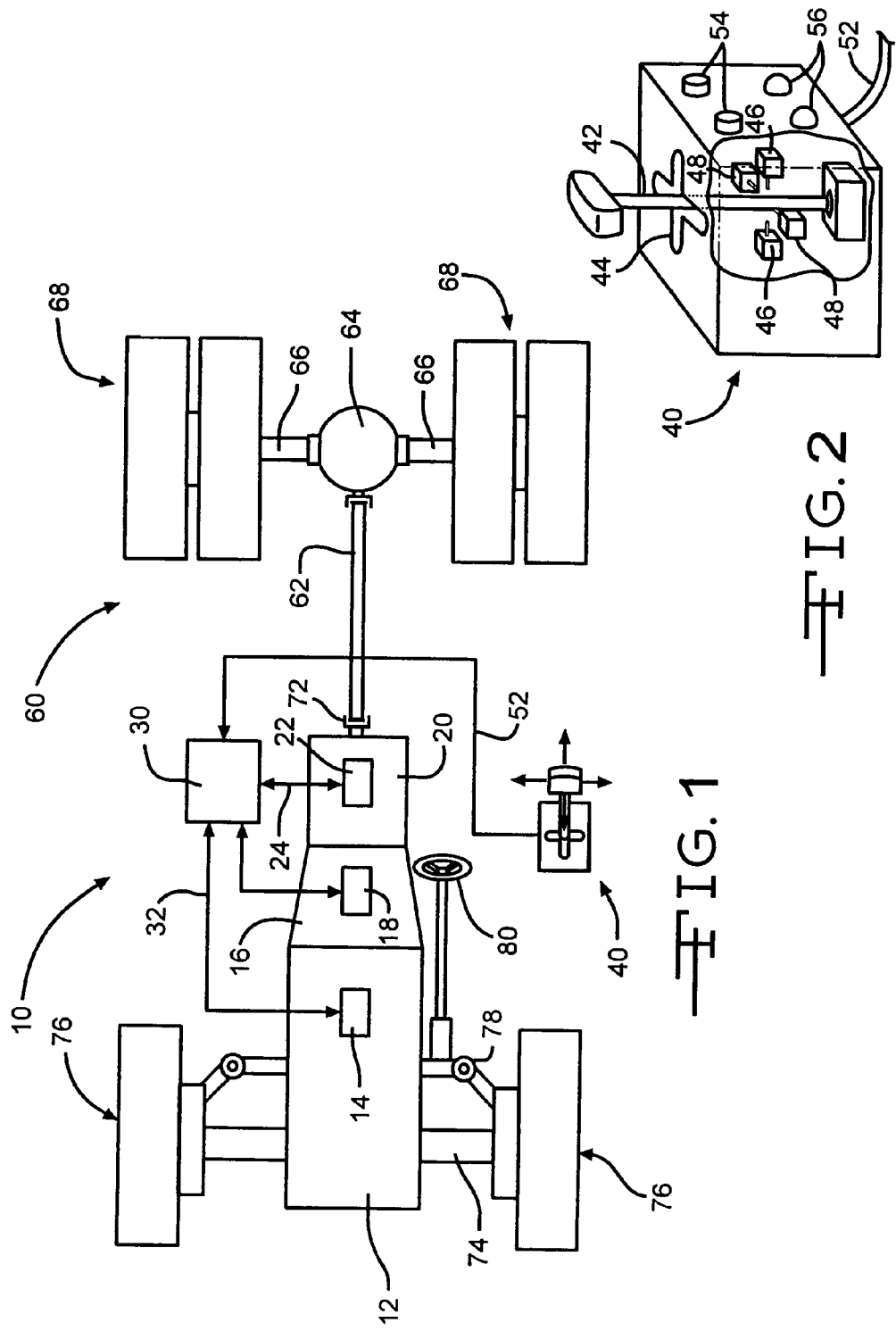

US 7,814,806 B2

APPARATUS AND METHOD FOR JOGGING TRANSMISSION NEUTRAL SWITCH

TECHNICAL FIELD

The invention relates generally to a control apparatus and method for automated mechanical transmissions and more particularly to a control apparatus and method which permit the vehicle operator to jog, i.e., cycle, components of the automated mechanical transmission when it is in neutral.

BACKGROUND OF THE INVENTION

Both conventional (manual) transmissions and automated mechanical transmissions (AMT's) typically include a simple two-state electrical switch associated with one of the shift rails of the transmission to provide an indication to associated components of the power train or the vehicle operator that the transmission is in neutral. Generally as well, such switches are associated with the engine starting circuitry such that the engine cannot be started unless the switch indicates that the transmission is in neutral. Typically, such switches are configured in a fail safe mode, that is, a normally closed switch provides a signal when the switch is deactivated by alignment with a recess or other feature in the shift rail which allows the switch to relax. When the switch is depressed because the shift rail is out of the neutral position, the switch is open and no signal passes to associated equipment. This configuration fails safe because an open switch, signal or wiring failure will be interpreted as not neutral by the associated power train components which is the safer failure mode. Furthermore, if the switch sticks in the depressed position, once again, the signal provided to associated components will be not neutral which will, for example, disable the engine start capability. This condition or failure mode is safer than a condition in which the transmission is not in neutral but the neutral switch sticks or malfunctions in some manner and indicates that the transmission is in neutral which may permit the engine to be started.

This fail safe configuration of the neutral switch, however, can occasionally create an operational and reliability problem. Simply because the neutral switch sticks in an open or non-neutral position due to aging, cold weather or other random influence, it will not be possible to start the vehicle engine.

Jogging, which is a shift lever action known to most users of manual transmissions, involves transversely moving the shift lever back and forth across the center, transverse portion of the shift pattern. While this action has no functional or operational consequences with regard to shifting the transmission, this is frequently done by a manual transmission operator to confirm that the transmission is in neutral. It has been found that quite frequently a sticking neutral switch can be at least temporarily corrected, i.e., unstuck, by jogging or cycling the shift lever and the associated shift rail.

BRIEF SUMMARY OF THE INVENTION

A method and apparatus for cycling a neutral switch of an automated mechanical transmission includes a shift actuator having side-to-side motion capability and an associated sensor or sensors which control a transversely oriented piston and shift rail assembly to provide corresponding motion along a transverse shift axis of the transmission which simulates operator commanded motion of a shift rail of a conventional (manual) transmission as the operator checks for neutral. Alternatively or additionally, side-to-side motion of the transversely oriented piston and shift rail assembly may be automatically commanded at the beginning of an ignition cycle. Such activity is frequently capable of releasing a malfunctioning neutral switch thereby providing a proper neutral indication to associated engine and transmission components to, for example, permit starting the engine.

Thus it is an object of the present invention to provide an apparatus for jogging a transverse shift rail and neutral switch of an automated mechanical transmission.

It is a further object of the present invention to provide a shift actuator having side-to-side motion for transversely moving a shift rail of an automated mechanical transmission.

It is a still further object of the present invention to provide a shift actuator having sensors responsive to side-to-side motion for jogging a transverse shift rail and a neutral switch of an automated mechanical transmission.

It is a still further object of the present invention to provide an apparatus for automatically jogging a transverse shift rail of a transmission to unstick neutral switch at the beginning of an ignition cycle.

It is a still further object of the present invention to provide a method of jogging a transverse shift rail to unstick a neutral switch in an automated mechanical transmission.

It is a still further object of the present invention to provide a method of sensing side-to-side motion of a shift actuator and jogging a transverse shift rail and unstick a neutral switch of an automated mechanical transmission.

It is a still further object of the present invention to provide a method of automatically jogging a transverse transmission shift rail and neutral switch at the beginning of an ignition cycle.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 1 is a diagrammatic, plan view of a truck tractor chassis having an automated mechanical transmission incorporating the present invention;

FIG. 2 is an enlarged, perspective view in partial section of a shift control actuator assembly for use with the present invention;

DESCRIPTION OF THE PREFERRED EMBODIMENTS

Figure 3:
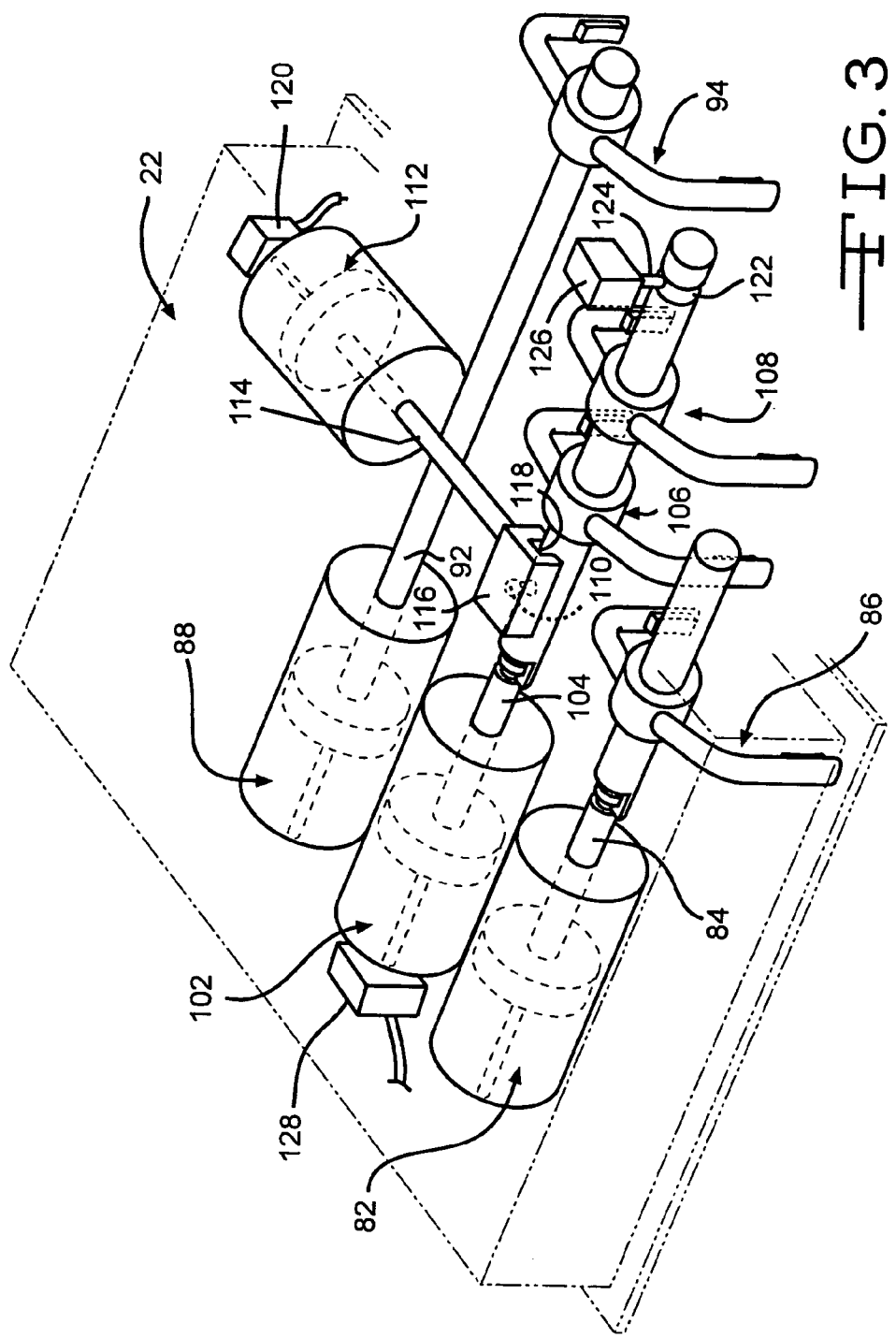
FIG. 3 is a diagrammatic, perspective view of a shift actuator assembly for an automated mechanical transmission incorporating the present invention.

Referring now to FIG. 1, a diagrammatic, plan view of a typical truck tractor chassis incorporating the present invention is illustrated and generally designated by the reference number 10. The truck tractor chassis 10 includes an engine or prime mover 12 which may be an internal combustion gas or Diesel engine controlled by an electronic engine control module 14. The engine 12 has an output provided directly to a master friction clutch 16. The master friction clutch 16 includes a pneumatic or hydraulic operator or actuator assembly 18 which selectively engages and disengages the clutch 16 and couples the output of the prime mover 12 to an input of a multiple speed, gear change transmission 20. The transmission 20 is preferably of the type currently designated as an automated mechanical transmission (AMT) wherein gear or speed ratio changes of a splitter, a main transmission, and a planetary gear assembly, for example, are all achieved by an automated, i.e., electric, hydraulic or pneumatic, shift actuator assembly 22 connected through a data or control link 24 to a master microprocessor or controller 30.

The master microprocessor or controller 30 includes data input ports, memory, one or more processors and data and control outputs driving, for example, the master friction clutch actuator assembly 18 and the shift actuator assembly 22.

The master microprocessor or controller 30 is preferably also coupled by a data and control link 32 to the engine control module 14. The engine control module 14 is an integral component of the engine or prime mover 12 and will typically include a processor or controller which receives data from an engine speed sensor and other sensors or devices (not illustrated) and controls, for example, a fuel metering device capable of adjusting and terminating the flow of fuel to the engine or prime mover 12 and thus regulate its speed.

Referring now to FIGS. 1 and 2, also linked to the master microprocessor or controller 30 is a shift control assembly 40. The shift control assembly 40 includes an operator manipulatable actuator such as a joystick or shift control 42 which may include a two axis gate 44 which defines and limits motion of the shift control 42 along perpendicular, i.e., longitudinal and transverse or X-Y, axes. Alternative shift patterns and gate arrangements may also be utilized with the present invention. The shift control assembly 40 also includes resilient or biasing features such as elastomeric bands or tension or compression springs (not illustrated) which provide a biasing or restoring force which drives the shift control 42 to the center of the gate 44. Typically, motion of the shift control 42 along the longitudinal track of the two axis gate 44 may be sensed by a sensor assembly 46 comprising either a linear transducer or a pair of momentary contact limit switches and will be utilized to detect operator commands to upshift or downshift the transmission 20. Similarly, a sensor assembly 48 which may comprise a linear transducer or a pair of momentary contact limit switches to detect left and right, i.e., lateral or transverse, motion of the shift control 42, that is, motion associated with the transmission 20 being in neutral. Both of the sensor assemblies 46 and 48 are connected to the master controller 30 by a cable or data link 52. The shift control assembly 40 may also include push button or toggle switches 54 and lights or indicators 56 to receive other operator commands and provide visual indications of system activity, respectively.

The output of the transmission 20 is provided to a rear driveline assembly 60 which includes a rear propshaft 62. The rear propshaft 62 drives a conventional rear differential 64. The rear differential 64 provides drive torque to a pair of rear axles 66 which are in turn coupled to left and right rear tire and wheel assemblies 68. The rear tire and wheel assemblies 68 may be either a dual configuration, as illustrated, a single left and right tire and wheel assembly or a tandem assembly. Suitable universal joints 72 may be utilized as necessary with the rear propshaft 62 to accommodate static and dynamic offsets and misalignments thereof. A stationary front axle 74 pivotally supports a pair of front tire and wheel assemblies 76 which are controllably pivoted by a steering linkage 78 which is coupled to and positioned by a steering wheel 80.

Referring now to FIG. 3, the shift actuator assembly 22 includes a first piston and cylinder assembly 82 which is associated with the splitter or forward two-speed transmission assembly (not illustrated). The first piston and cylinder assembly 82 bi-directionally translates a first piston rod and shift rail assembly 84 which is coupled to a first shift fork assembly 86 which engages a dog clutch (not illustrated) in the splitter. A second piston and cylinder assembly 88 is associated with a rear or auxiliary two-speed planetary gear assembly (not illustrated). The second piston and cylinder assembly 88 bi-directionally drives a second piston rod and shift rail assembly 92 which is coupled to and correspondingly translates a second shift fork assembly 94 which in turn translates a dog clutch (not illustrated) of the planetary gear assembly. Disposed between the first and second piston and cylinder assemblies 82 and 88 is a third, engage piston and cylinder assembly 102. The third, engage piston and cylinder assembly 102 bi-directionally drives a third, engage piston rod and shift rail assembly 104 to which are secured third and fourth shift fork assemblies 106 and 108, respectively. The third and fourth shift fork assemblies 106 and 108 engage dog clutches (not illustrated) associated with the main transmission which typically provides three or four forward gears and one reverse gear. A driving or rotating lug or pin 110 is secured to the third piston rod and shift rail assembly 104 and extends radially a short distance therefrom. The first, second and third piston and cylinder assemblies 82, 88 and 102 preferably provide three axial positions: a first or forward position, a second or centered position and a third or rear position.

A fourth, transversely disposed piston and cylinder assembly 112, typically referred to as a select piston and cylinder assembly 112, bi-directionally drives a fourth, transversely disposed piston rod and shift rail assembly 114. The fourth, select piston and cylinder assembly 112 and the fourth piston rod and shift rail assembly 114 also provide three positions: left, center and right. Secured to the end of the fourth piston rod and shift rail assembly 114 is an elongate U-shaped engagement member 116 defining an elongate slot 118 which is perpendicular to the fourth piston rod and shift rail assembly 114, parallel to the third piston rod and shift rail assembly 104 and in constant engagement with the driving or rotating lug 110 on the third, engage piston rod and shift rail assembly 104. That is, the length of the engagement member 116 and the slot 118 is long enough that the rotating lug 110 remains within it as the third, engage piston rod and shift rail assembly 104 is moved to either its forward or rearward position. Preferably, a linear transducer 120 is associated with the fourth, select piston and cylinder assembly 112 to provide real time data to the master controller 30 regarding the position of the fourth, select piston rod and shift rail assembly 116.

The third, engage piston rod and shift rail assembly 104 preferably includes a circumferential channel or recess 122 which, when the third, engage piston and cylinder assembly 102 is in its center position, receives a spring biased plunger or actuator 124 of a two-position, normally closed neutral sensor or switch 126. In this (center) position of the third piston rod and shift rail assembly 104, the neutral switch 126 is closed, providing a signal to the master controller 30 indicating that the transmission 20 is in neutral. When the third, engage piston and shift rail assembly 104 moves in any direction, away from the center position, the actuator 124 is depressed, and the neutral switch 126 opens, providing a not neutral indication to the master controller 30. It will be appreciated that other switch configurations and switch actuating features may be utilized in connection with the third piston rod and shift rail assembly 104. Finally, a linear transducer 128 is associated with the third, engage piston and cylinder assembly 102 to provide real time data to the master controller 30 regarding the position of the third, engage piston rod and shift rail assembly 104 and to confirm or provide a check on the operation of the neutral switch 126. Additional linear transducers (not illustrated) may be utilized with the first and second piston and cylinder assemblies 82 and 88 to provide real time data to the master controller 30 regarding the positions of the first piston rod and shift rail assembly 84 and the second piston rod and shift rail assembly 92, respectively.

Figure 4:
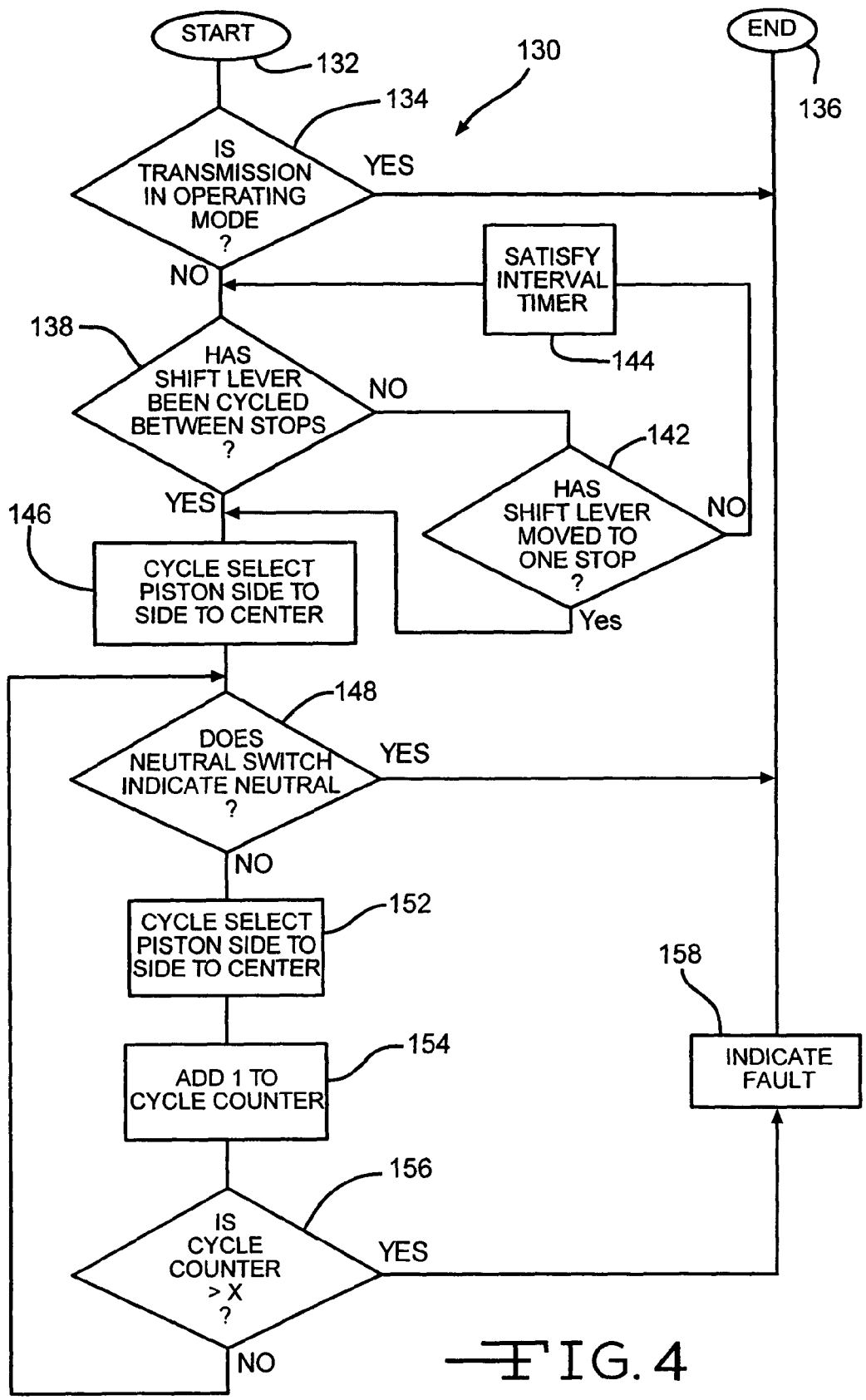
FIG. 4 is a block diagram of a computer program (software) for use with a shift actuator and automated mechanical transmission embodying the present invention.

Referring now to FIG. 4, a computer program or software according to the present invention is illustrated and designated by the reference number 130. It should be appreciated that the program 130 is presented by way of illustration and example and that variations with regard to the order of steps, the exact nature of inquiries and numerical values may, and typically will, be adjusted to function with diverse vehicle hardware and systems. The program or software 130 is a subroutine that may be utilized in connection with an extensive master or executive control and processing system contained within the master controller 30 and which may be executed at any convenient iteration interval. The program 130 commences with a start or initialization step 132 in which any interval or count registers are reset to zero and data and sensors may be read and stored, for example. The program 130 then moves to a decision point 134 which inquires whether the automated mechanical transmission 20 is in an operating mode. This inquiry may take the more specific form of whether any forward or reverse operating gear of the transmission 20 has been requested, whether the transmission 20 is carrying out a commanded shift in either an automatic or manual mode or whether the transmission 20 is currently operating in any forward or reverse gear. If the broad question illustrated in FIG. 4 or any of those specific questions recited above are true, the decision point 134 is exited at YES and the program 130 terminates at the end point 136.

If none of the subject questions are answered in the affirmative, the decision point 134 is exited at NO. The program 130 then moves to a decision point 138 which inquires whether the operator manipulatable actuator or shift control 42 has been cycled between its left and right stops, that is, whether the sensors or switches 48 have been activated. If they have not, the decision point 138 is exited at NO and the program 130 moves to a decision point 142 which inquires whether the shift control 42 has been moved such that one of the sensors or switches 48 has been activated. If it has not, the decision point 142 is exited at NO and an interval timer 144 times out a brief period such as 250 milliseconds, 500 milliseconds, or one second, for example. The program 130 then returns to the input of the decision point 138. If either the decision point 138 or the decision point 142 are answered YES, the program 130 moves to a process step 146 which commands the fourth, select piston and cylinder assembly 112 to cycle the fourth piston rod and shift rail assembly 114 from one side to the other side and return to the center position as illustrated in FIG. 3. During this time the third piston rod and shift rail assembly 104 remains in its center position with the actuator 124 of the neutral switch 126 in the recess 122 such that the normally closed neutral switch 126 is closed and provides a signal to the master controller 30 indicating neutral. Although not shown, the program 130 may also include steps which respond to the shift control 42 being held for a period of time in its left or right position. The steps may include prohibition of any shifting by the transmission 20 and movement and maintenance of the fourth, select piston and cylinder assembly 114 and associated fourth piston rod and shift rail assembly 116 in a left or right position.

Then the program 130 moves to a decision point 148 which inquires whether the neutral switch 126 is indicating neutral. The transducer 128 associated with the third, engage piston and cylinder assembly 102 will, in this position, provide an indication that the third piston rod and shift rail assembly 104 is centered or in neutral and thus that the neutral switch 126 should indicate neutral. These two sensors are utilized in independent systems to provide redundancy and thus improved assurance that the transmission 20 is, in fact, in neutral. If the neutral switch 126 does indicate neutral, the decision point 148 is exited at YES and the program terminates at the end point 136. If the neutral switch 126 does not indicate the neutral condition of the transmission 20, the decision point is exited at NO, the program 130 moves to a process step 152 which once again cycles the fourth, select piston cylinder assembly 112 from one side to the other side and returns it to the center position.

Next, a process step 154 adds a count to a cycle counter. Then a decision point 156 is entered which inquires whether the count of the cycle counter is greater than a predetermined small whole number. This number may be, for example, 4, 5, 6 or 7 or more or less depending on the number of attempts considered reasonable to undertake to free a stuck neutral switch 126. If this cycle counter number has not been exceeded, the decision point 156 is exited at NO and the program 130 returns to the input of the decision point 148 which again determines whether the neutral switch 126 is, in fact, indicating neutral. If the count of the cycle counter has exceeded the predetermined value, the decision point 156 is exited at YES and the program 130 preferably provides an indication either visually or electrically to the master controller 30 in the process step 158 that a fault, i.e., an apparently inoperative neutral switch 126. A fault indication may also be provided when the neutral switch 126 indicates neutral and the transducer 128 associated with the third piston and cylinder assembly 122 does not or vice versa. The program 130 then terminates at the end point 136.

Details regarding operation of the shift lever assembly 40 and the neutral jog program or software 130 will now be described. At the outset, it should be appreciated that the shift lever assembly 40 and specifically the shift control 42 when utilized along the longitudinal or front to back (Y) motion axis of the gate 44 is conventional. That is, forward motion of the shift control 42 will typically be interpreted as a request for a shift into first gear (or other appropriate starting gear) or an upshift in either the automatic, semi-automatic or manual operating modes of the transmission 20 and motion to the rear of the shift control 42 will be interpreted as a request for a downshift including a shift to neutral, or, when in neutral a shift to reverse.

It should also be appreciated that jogging or cycling of the transverse, fourth or select piston rod and shift rail assembly 114 has no functional or operational purpose with regard to gear selection and operation of the transmission 20. Rather, it is intended to check operation of the neutral sensor or switch 126, confirm its neutral indication, unstick a malfunctioning neutral switch 126 and facilitate starting the engine 12. Finally, it should be understood and appreciated that the transverse motion of the fourth, select piston and cylinder assembly 112 and the rotary motion of the third, engage piston rod and shift rail assembly 104 it generates, does not directly and positively jog the neutral switch 126. Such jogging or cycling, in fact, would occur if and only if the third, engage piston and cylinder assembly 102 and the third piston rod and shift rail assembly 104 were translated between its front and rear positions. Nonetheless, it has been found that the conventional side-to-side motion of the shift control 42

(duplicating the neutral checking motion of a conventional manual transmission) as duplicated in an automated mechanical transmission such as the transmission 20 by the sudden motion of the fourth, select piston and cylinder assembly 112 and the fourth piston rod and shift rail assembly 114 is generally sufficient to release a sticking neutral switch 126.

As the software program 130 makes clear, a neutral jog activity occurs only when the transmission 20 is not in an operating mode, not undertaking a shift or not in any other active, operating state. When, however, the transmission 20 is in neutral with all of the piston and cylinder assemblies 82, 88, 102 and 112 in their centered positions, side-to-side motion of the shift control 42, that is, motion along the transverse or X axis of the two axis gate 44 will cause side-to-side motion of the fourth or select piston rod and shift rail assembly 112 and provide sufficient mechanical impulses to the transmission 20 to unstick a sticking neutral switch 126.

Whether the side-to-side motion of the shift control 42 is produced by the vehicle operator out of habit, extensive experience with prior mechanical transmissions or as an actual attempt to free or unstick a malfunctioning neutral switch 126, the action of the fourth or select piston and cylinder assembly 112 mimics this motion and it will, in response to the vehicle operator's transverse movement of the shift control 42, correspondingly jog or cycle the fourth, select piston rod and shift rail assembly 114. In this manner, a neutral switch 126 which may be intermittently malfunctioning may be sufficiently bumped or upset to unstick it and provide a proper neutral indication to associated components and equipment of the truck tractor 10 and, for example, thereby permit starting the vehicle engine or prime mover 12.

Figure 5:
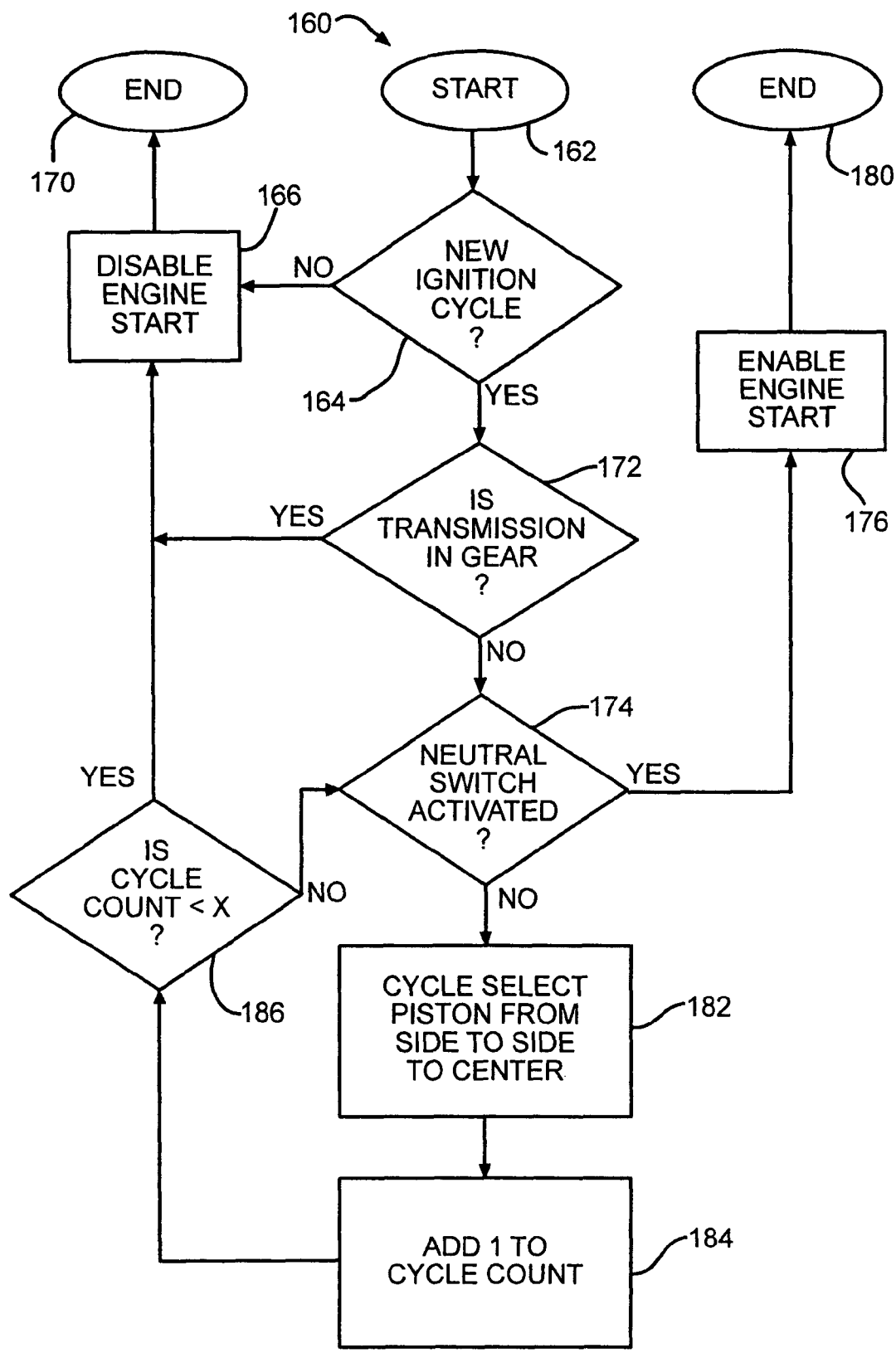
FIG. 5 is a block diagram of a computer program (software) for commanding transverse shift rail motion of an automated mechanical transmission at the beginning of an ignition cycle.

Referring now to FIG. 5, an additional computer program or software according to the present invention is illustrated and designated by the reference number 160. The program 160 independently and automatically, i.e., without operation command or intervention, attempts to cycle the fourth piston rod and shift rail assembly 114 at the beginning of each ignition cycle. It should be appreciated that the program 160 is also presented by way of illustration and example and that variations with regard to the order of the steps, the presence or absence of certain steps, the exact nature of the inquiries and processes and numerical values may, and typically will, be adjusted to function with various transmissions, vehicle systems and other hardware. The program or software 160 is a subroutine that may be utilized in connection with an extensive master or executive control and processing system contained within the master controller 30 and which may be executed upon vehicle start-up or at any convenient iteration interval. The program or software 160 commences with a start or initialization step 162 in which any time interval or numerical count registers are reset to zero and any information or operating data from sensors or a vehicle bus may be read and stored, for example. The program or software 160 then moves to a decision point 164 which inquires whether the vehicle 10 and specifically the master controller 30 is beginning a new ignition cycle. If it is not, the decision point 164 is exited at NO and the program 160 moves to a process step 166 which disables the start circuit and/or start capability of the internal combustion engine 12. The program or software 160 then ends at an end point 170.

If the truck tractor 10 is commencing a new ignition cycle, decision point 164 is exited at YES and the program or software 160 moves to a decision point 172 which inquires whether the transmission 20 is in gear. Data utilized by the decision point 172 may come from data stored after the previous ignition cycle, from the sensors such as the sensors 120 and 128 which provide a real time indication of the positions of the fourth, select piston and shift rail assembly 114 and the third, engage piston and shift rail assembly 104 respectively, or other sensors or data sources. If it is determined from this data that the transmission 20 is in gear, the decision point 172 is exited at YES and the program or software 160 moves to the process step 166 which disables the engine start function and the program 160 terminates at the end point 170. If the transmission is not in gear, the decision point 172 is exited at NO and the program or software 160 moves to a decision point 174 which inquires whether the neutral switch 126 is closed or activated, indicating that the third engage piston and shift rail assembly 104 is in neutral. If the neutral switch 126 is closed, indicating that the transmission 20 is in neutral, the decision point 174 is exited at YES and the program or software 160 moves to a process step 176 which enables the start circuit or start capability of the engine 12. The program then ends at a second termination or end point 180. If the neutral switch is open indicating either that, in fact, the transmission 20 is not in neutral or that the neutral switch 126 may be sticking in its open or depressed position, the decision point 174 is exited at NO and the program or software 16 moves to a process step 182 which cycles the fourth, select piston and shift rail assembly 114 from side-to-side and returns it to a center position. In a process step 184, one count is added to a cycle counter and the program or software 160 moves to a decision point 186 which inquires whether the cycle count exceeds a predetermined value X. If it does not, the decision point 186 is exited at NO and the program 160 returns to the decision point 174 which again inquires whether the neutral switch 126 is closed, thus indicating that the transmission 20 is, in fact, in neutral. Returning to the decision point 186, if the cycle count exceeds a value X which typically is a small whole number, the decision point 186 is exited at YES and the program 160 moves to the process step 166 which disables the start function and/or start circuitry of the engine 12 and the program 160 then terminates at the termination or end point 170.

It will be appreciated that in the foregoing program or software 160, the shift actuator assembly 22 through the agency of the master controller 30 and the program 160 initially and automatically, that is, without operator intervention, cycles the fourth, select piston and shift rail assembly 114 to jog it in attempt to unstick the neutral switch 126 at the beginning of an ignition cycle if operating history and sensors indicate that the transmission is not in gear while the neutral switch 126 is simultaneously indicating that the transmission 20 is not in neutral. Thus, the program or software 160 operates in a preemptive, automatic manner to attempt to unstick a hung up neutral switch 126 without operator intervention and therefore to improve the overall reliability of the transmission 20.

The foregoing disclosure is the best mode devised by the inventors for practicing this invention. It is apparent, however, that apparatus incorporating modifications and variations will be obvious to one skilled in the art of automated mechanical transmissions. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

The invention claimed is:

1. A method of freeing a neutral sensor in an automated mechanical transmission comprising:

in an automated mechanical transmission system having a shift control assembly with a first piston and cylinder assembly having a first bi-directionally translating output and a first shift rail coupled to said first bi-directionally translating output, a second piston and cylinder assembly in a transverse orientation with respect to said first piston and cylinder assembly and having a second bi-directionally translating output and a second shift rail coupled to said second bi-directionally translating output, wherein said second shift rail is at least partially rotatable and mechanically coupled to the first shift rail, and a sensor for indicating a neutral position of said second shift rail;

bi-directionally translating said first piston and cylinder assembly and said first shift rail from side-to-side; and wherein translating said first piston and cylinder assembly and said first shift rail at least partially rotates said second shift rail and assists in freeing said sensor.

2. The method of claim 1, wherein said automated mechanical transmission system has a transducer in communication with said second piston and cylinder assembly, the method further comprising receiving an indication of a neutral position of said second shift rail via the transducer before bi-directionally translating said first piston and cylinder assembly.

3. The method of claim 1, wherein said sensor is a two-position switch.

4. The method of claim 1, further comprising detecting a new ignition cycle, wherein said bi-directionally translating said first piston and cylinder assembly and said first shift rail from side-to-side is in response to said detecting of said new ignition cycle.

5. The method of claim 1, further comprising repeating said translating step if said sensor does not indicate a neutral position in response to said translating said first piston and cylinder assembly and said first shift rail.

6. The method of claim 5, further comprising indicating a fault condition if said repeating of said translating step does not free said sensor.

7. An automated mechanical transmission system, comprising:
an automated mechanical transmission;
a first piston and cylinder assembly for bi-directionally translating a first shift rail;
a second piston and cylinder assembly for bi-directionally translating a second shift rail, wherein said second piston and cylinder assembly is oriented in a transverse orientation with respect to said first piston and cylinder assembly, and said second shift rail is at least partially rotatable and mechanically coupled to the first shift rail;
a neutral sensor for indicating a neutral position of said second shift rail;
a controller in communication with said first piston and cylinder assembly, said second piston and cylinder assembly, and said neutral sensor, said controller operable to:
move said first piston and cylinder assembly and said first shift rail from side-to-side to center, wherein moving said first piston and cylinder assembly and said first shift rail at least partially rotates said second shift rail and assists in freeing said sensor;
receive an indication from said neutral sensor; and
determine whether said neutral sensor provides a neutral indication when said second piston and cylinder assembly and said second shift rail is in a center position.

8. The automated mechanical transmission system of claim 7, wherein the controller is further operable to inhibit motion of said first piston and cylinder assembly when said automated mechanical transmission is in an operating mode.

9. The automated mechanical transmission system of claim 7, wherein said neutral sensor is a two-position switch.

10. The automated mechanical transmission system of claim 7, wherein the controller is further operable to detect a new ignition cycle, wherein said moving of said first piston and cylinder assembly is in response to said detecting of said new ignition cycle.

11. The automated mechanical transmission system of claim 7, wherein the controller is further operable to repeat said moving and determining steps if said sensor does not indicate a neutral position in response to said moving said first piston and cylinder assembly and said first shift rail.

12. The automated mechanical transmission system of claim 7, further comprising:
a shift actuator for accepting commands from a vehicle operator; and
a transverse sensor operable to detect transverse motion of said shift actuator, wherein said controller is further operable to receive an indication from said transfer sensor that the shift actuator has been displaced in a direction of travel transverse to a direction of travel operable to select an operating mode of said automated mechanical transmission.

13. A method of freeing a malfunctioning vehicle transmission neutral sensor comprising:
in a transmission system having a shift control assembly with a first piston and cylinder assembly for bi-directionally translating a first shift rail, a second piston and cylinder assembly for bi-directionally translating a second shift rail, wherein said second piston and cylinder assembly is oriented in a transverse orientation with respect to said first piston and cylinder assembly, and said second shift rail is at least partially rotatable and mechanically coupled to the first shift rail, and a neutral sensor for indicating a neutral position of said second shift rail, performing:
sensing a beginning of an ignition cycle of a vehicle engine mechanically coupled to said transmission system;
cycling said first piston and cylinder assembly from side-to-side, wherein cycling said first piston and cylinder assembly from side-to-side at least partially rotates said second shift rail and assists in freeing said sensor; and
repeating said cycling for a predetermined number of times if no neutral signal is received said neutral sensor.

14. The method of claim 13, wherein said automated mechanical transmission system has a transducer in communication with said second piston and cylinder assembly, the method further comprising receiving an indication of a neutral position of said second shift rail via the transducer before cycling said first piston and cylinder assembly from side-to-side.

15. The method of claim 13, wherein said neutral sensor is a normally closed switch.

16. The method of claim 13, further comprising inhibiting motion of said first piston and cylinder assembly when said vehicle transmission is in an operating mode.

17. A neutral jog system for an automated mechanical transmission, comprising:
a transmission shift actuator assembly having a first piston and cylinder assembly comprising a first piston rod and a first shift rail coupled to said first piston rod and a second piston and cylinder assembly comprising a second piston rod and a second shift rail coupled to said second piston rod, wherein said second piston and cylinder assembly is oriented in a transverse orientation with respect to said first piston and cylinder assembly, and said second shift rail is at least partially rotatable and mechanically coupled to the first shift rail;

a neutral sensor operable to indicate when said second shift rail is in a neutral position;

a shift actuator assembly having a transversely moveable shift control and at least one transverse sensor for detecting transverse motion of said shift lever; and a controller, operable to:

receive a signal from said at least one transverse sensor indicating transverse motion of said shift control;

provide a signal to said first piston and cylinder assembly for moving said first shift rail from side to side and to a center position, wherein moving said first piston and cylinder assembly and said first shift rail at least partially rotates said second shift rail and assists in freeing said sensor; and receive a signal from said neutral sensor indicating that said shift rail is in a center, neutral position.

18. The neutral jog system of claim 17, wherein said neutral sensor comprises a normally closed switch.

19. The neutral jog system of claim 17, wherein said at least one transverse sensor comprises two switches.

20. The neutral jog system of claim 17, further comprising a linear sensor coupled to said second piston rod, wherein said linear sensor is operable to detect a neutral position of said second piston rod, the controller further operable to receive a neutral position indication from said linear sensor.

* * * * *